April 12, 1960 P. L. KERSHAW ET AL 2,932,817
ELECTRICAL REMOTE INDICATING AND REPEATING SYSTEMS
Filed March 21, 1957
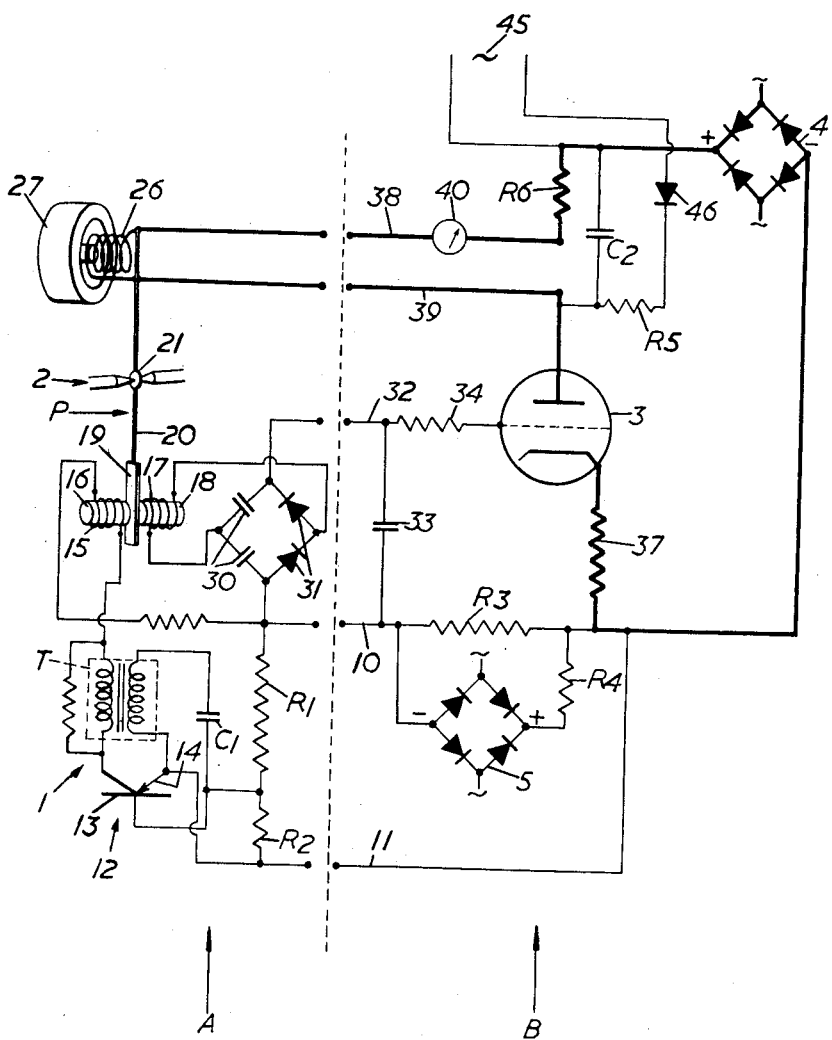
Inventors
Peter L. Kershaw
Trevor E. Oliver
By Ralph B. Stewart
Attorney

United States Patent Office 2,932,817
Patented Apr. 12, 1960

2,932,817

ELECTRICAL REMOTE INDICATING AND REPEATING SYSTEMS

Peter Leslie Kershaw and Trevor Exelby Oliver, London, England, assignors to Evershed & Vignoles Limited, London, England, a British company Application March 21, 1957, Serial No. 647,653

Claims priority, application Great Britain March 22, 1956

2 Claims. (Cl. 340—187)

This invention relates to electrical remote indicating or repeating systems. The invention is particularly concerned with a system of the same general kind as described in British patent specification No. 589,423, that is to say, a system in which the remote indicators or repeaters are supplied by means of the anode current of a thermionic valve having a grid condenser, which is charged or discharged in accordance with the position of a moving element responsive to the quantity to be repeated. The moving element is acted on by a force or torque which is proportional to the quantity to be repeated, and under balance conditions this force or torque is opposed by an equal and opposite force or torque proportional to the anode current of the valve. As soon as there is any change in the quantity to be indicated, this balance is upset, the charge on the grid condenser of the valve is adjusted accordingly and the grid potential is correspondingly adjusted to give an anode current which is again proportional to the new value of the quantity to be indicated and which at the same time restores the balance of the moving element.

According to the present invention the moving element serves to control the position of a metal vane, itself controlling the coupling of a pair of coils, one of which is supplied with high frequency alternating current, while the output of the second coil, after rectification, is used to control the charge on the grid condenser of the thermionic valve. The anode current of the valve operates one or more indicating instruments or repeaters, as previously described, and at the same time produces an opposing force or torque, tending to restore the balance of the moving element. Under steady conditions the moving element is in a state of equilibrium under the action of the force or torque proportional to the magnitude to be repeated and the balancing force or torque produced by the anode current of the valve. As soon as there is any variation in the magnitude to be indicated the moving element is displaced so as to change the position of the moving vane, thereby altering the coupling between the two coils and changing the output voltage of the second coil so as to charge or discharge the grid condenser of the valve. The consequent change in the anode current of the valve is in such a direction as to restore the balance of the moving element, while at the same time adjusting the indicating instrument so as to show the new value of the magnitude in question.

Preferably, the high frequency alternating current is supplied by a transistor oscillator. In general it is convenient for the moving element and the oscillator to be situated at one point, while the thermionic valve, the source of electrical supply and one or more of the indicating instruments are situated at a remote point. Under these conditions the use of a transistor oscillator is particularly advantageous since no separate conductor is required to supply the heater circuit of a thermionic valve. Moreover, one conductor may be used in common with the supply to the oscillator and the output of the second coil to the grid condenser of the thermionic valve. With such an arrangement only three conductors are required for the supply to the oscillator and the output circuit of the second coil, a further two conductors being required for the anode current of the thermionic valve which is supplied to the balancing coil of the moving element.

A system in accordance with the invention will now be described in more detail by way of example with reference to the accompanying circuit diagram.

The system shown consists of two separate halves situated at points remote from one another. The left-hand half indicated generally as A, includes a transistor oscillator shown generally as 1 and a moving element shown generally as 2. The right-hand half B includes a thermionic valve 3, its supply rectifier 4 and a supply rectifier 5 for the oscillator 1. The rectifier 5 supplies the oscillator 1 by way of conductors 10 and 11 which are shown broken to indicate the spacing between the two halves of the system. The oscillator includes a transistor 12, a transformer T and a condenser C1. Resistances $R_1$ and $R_2$ connected between the conductors 10 and 11 constitute a potential divider, the voltage across the resistance $R_1$ supplying the collector current of the transistor 12 and the voltage across the resistance $R_2$ providing the necessary bias to maintain the base electrode 13 of the transistor 12 positive with respect to the emitter electrode 14. The output of the oscillator is supplied to a coil 15 wound on a core 16 and which serves to induce a corresponding voltage in a coil 17 wound on a core 18.

The two cores 16 and 18 are separated by a relatively narrow gap in which moves a light aluminum vane 19 mounted on a lever arm 20 pivoted at 21. The lever arm 20 is acted on by a force or torque shown as P which represents the quantity to be indicated or repeated. This force or torque is balanced by a force exerted between a coil 26 carried by the lever arm 20 and a stationary pot magnet 27. Under equilibrium conditions the vane 19 is partially inserted in the gap between the cores 16 and 18 and it will be appreciated that the coupling between the two coils 15 and 17 will vary with the position of the vane 19 and hence of the lever arm 20.

The output voltage from the coil 17 is applied to a voltage doubler comprising condenser 30 and rectifiers 31 and the output of this voltage doubler is carried by a conductor 32 and the conductor 10 which thus serves both for this purpose and for the oscillator supply. The output voltage is used to charge a condenser 33 connected by way of a resistance 34 to the grid of the valve 3. The opposite plate of the condenser is connected to the cathode lead of the valve and consequently the charge on the condenser 33 controls the potential of the grid in relation to the cathode and hence the anode current of the valve.

The anode current of the valve is supplied by the rectifier 4, flowing through a cathode resistance 37. The anode circuit also includes a resistance $R_6$ and conductors 38 and 39 supplying the coil 26 carried by the lever arm 20 and any required number of indicating instruments or repeaters, one of which is shown at 40. Under balance conditions of the lever arm 20 the force or torque P is directly proportional to the current flowing in the coil 26 and since the same current flows in the indicator 40 this provides a direct reading of the magnitude of the quantity to be indicated. If this quantity and hence the force or torque P increases, the lever arm 20 is rocked so as to move the vane further out from between the coils 15 and 17, thus increasing the coupling between them and increasing the output voltage of the coil 17. This produces a corresponding increase of the charge on the condenser 33 and hence in the anode current of the valve 3. Since this also flows through the coil 26 the balancing force exerted is also increased so as to return the vane 19 until a fresh position of equilibrium is reached in which again the force exerted by the coil 26 balances that applied by the force or torque P. Consequently any variations in the quantity to be indicated are reproduced as variations in the anode current 3 and hence as readings of the indicator or repeater 38.

When the force or torque P is zero it allows the vane 19 to move into the position in which it is fully inserted between the coils 15 and 17 and in which the coupling between the coils is consequently a minimum. Under these conditions, however, the coupling is not zero so that there is still some voltage applied to the condenser 33 and consequently, in the absence of any compensating arrangements, the current in the indicator 40 and in the coil 26 would not be zero. To overcome this difficulty resistances $R_3$ and $R_4$ are connected in series across the supply rectifier 5 and act as a potential divider. The voltage across the resistance $R_3$ opposes that from the voltage doubler and just balances it when the force or voltage P is zero. Under these conditions the potential between the grid of the valve 3 and the bottom of the cathode resistance 37 is zero, but the valve will still conduct, the magnitude of the current depending on the self-generated bias across the cathode resistance 37.

Thus in order to reduce the current through the indicator 40 in the coil 26 to zero an additional current is injected into this part of the circuit in opposition to the anode current of the valve 3. This current is derived from a source of alternating supply 45, being rectified by a rectifier 46, having a resistance $R_5$ in series with it. In addition, a condenser C2 is connected between the end of the resistance $R_5$ and the other pole of the supply. Thus when the force or torque P is zero the injected current causes both the reading of the indicator 40 to be zero and also the force exerted between the coil 26 and the pot magnet 27 to be zero. Under other conditions the injected current will, of course, subtract from the anode current of the valve 3 to ensure that the reading of the indicator 40 is strictly proportional to the force or torque P.

We claim:

1. An electrical system for the remote indication of a physical quantity, comprising a first set of components situated at one locality and a second set of components situated at a second locality remote from said first locality, said first set of components comprising a moving element, means for applying to said element a torque proportional to said physical quantity, current-controlled means for applying a balancing torque to said element, first and second coils mounted adjacent one another so as to provide electrical coupling between them, a metal vane carried by said movable element to move between said coils, thereby altering said coupling, a transistor oscillator for supplying high frequency alternating current to said first coil, and means for rectifying the resultant output current of said second coil, said second set of components comprising a thermionic tube having a plate, a cathode and a grid, a capacitor connected between said cathode and said grid, at least one electrical indicating instrument connected in the plate circuit of said tube, a first source of electrical supply for said oscillator, a second source of electrical supply connected in the plate circuit of said tube and a plurality of conductor means extending between said two localities and serving respectively to connect said first source of supply to said oscillator, to connect said rectifying means across said capacitor, whereby the charge on said capacitor is adjusted in accordance with the output voltage of said second coil and to connect said means for applying a balancing torque in series with said indicating instrument in the plate circuit of said tube, and means for injecting an additional current into the circuit including said indicating instrument and said means for applying a balancing torque, the direction and magnitude of said additional current being such that when said physical quantity is zero the resultant current in said circuit is also zero.

2. A system as claimed in claim 1, in which said plurality of conductor means include first, second and third conductors, said first and second conductors connecting said first source of supply to said oscillator and said second and third conductors connecting said rectifying means to said capacitor.

References Cited in the file of this patent

UNITED STATES PATENTS

| | | |
|---|---|---|
| 1,154,260 | Brandonburger | Apr. 11, 1939 |
| 2,602,660 | Shannon | July 8, 1952 |
| 2,631,027 | Payne | Mar. 10, 1953 |

FOREIGN PATENTS

| | | |
|---|---|---|
| 589,423 | Great Britain | June 19, 1947 |
| 757,060 | Great Britain | Sept. 12, 1956 |